United States Patent
Cui et al.

(10) Patent No.: US 11,265,837 B2
(45) Date of Patent: Mar. 1, 2022

(54) SYSTEM, METHOD, AND PRODUCT FOR SELECTING TIMING INFORMATION BASED ON SUBCARRIER SPACING

(71) Applicant: Apple Inc., Cupertino, CA (US)

(72) Inventors: Jie Cui, Santa Clara, CA (US); Yang Tang, San Jose, CA (US); Rui Huang, Beijing (CN); Yuan Zhu, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/480,272

(22) PCT Filed: Mar. 14, 2018

(86) PCT No.: PCT/US2018/022409
§ 371 (c)(1),
(2) Date: Jul. 23, 2019

(87) PCT Pub. No.: WO2018/175176
PCT Pub. Date: Sep. 27, 2018

(65) Prior Publication Data
US 2019/0394741 A1     Dec. 26, 2019

Related U.S. Application Data

(60) Provisional application No. 62/476,420, filed on Mar. 24, 2017.

(51) Int. Cl.
*H04W 56/00* (2009.01)
*H04L 5/00* (2006.01)
*H04W 8/08* (2009.01)
*H04W 36/08* (2009.01)

(52) U.S. Cl.
CPC ....... *H04W 56/0045* (2013.01); *H04L 5/0094* (2013.01); *H04W 8/08* (2013.01); *H04W 36/08* (2013.01); *H04W 56/0005* (2013.01)

(58) Field of Classification Search
CPC ... H04W 56/0045; H04W 8/08; H04W 36/08; H04W 56/0005; H04L 5/0094
See application file for complete search history.

(56) References Cited

U.S. PATENT DOCUMENTS 9,455,851 B1 *   9/2016 Donmez .............. H04L 27/122
2014/0086161 A1   3/2014 Cai et al.
(Continued)

FOREIGN PATENT DOCUMENTS

CN      103298136 A     9/2013
CN      104662971 A     5/2015
(Continued)

OTHER PUBLICATIONS

Ericsson, "Analysis of Uplink Transmit Timing in NB-IoT", R4-161945, 3GPP TSG RAN WG4 Meeting #78bis, San Jose del Cabo, Mexico, Agenda Item 6.13.5, Apr. 11-15, 2016, 7 pages.
(Continued)

*Primary Examiner* — Omar J Ghowrwal
(74) *Attorney, Agent, or Firm* — Stoel Rives LLP

(57) ABSTRACT

User equipment performs autonomous time adjustment that includes selecting a Timing Error Limit (i.e. $T_{e\_NR}$) and Maximum Autonomous Time Adjustment Step (i.e. $T_{q\_NR}$) based on bandwidth (BW) and subcarrier spacing (SCS). In one embodiment, given a certain downlink BW, if the SCS=x(kHz) and the $T_{e\_NR}$ of this SCS is N, then the $T_{e\_NR}$ of SCS=x/2(kHz) is 2*N. Given a certain downlink BW, if the SCS=x(kHz) and the $T_{e\_NR}$ of this SCS is N, then the $T_{e\_NR}$ of SCS=2*x(kHz) is N/2. For example, given BW=10 MHz, if the $T_{e\_NR}$ of SCS=30kHz is $n*T_{s\_NR}$ ($T_{s\_NR}$ is the basic timing unit for NR system), then the $T_{e\_NR}$ of SCS=60 kHz is $N/2*T_{s\_NR}$, and the $T_{e\_NR}$ of SCS=15 kHz is $2*N*T_{s\_NR}$.

18 Claims, 7 Drawing Sheets

(56) References Cited

U.S. PATENT DOCUMENTS

| | | | | |
|---|---|---|---|---|
| 2014/0334448 | A1* | 11/2014 | Langereis | H04W 28/18 |
| | | | | 370/331 |
| 2016/0020800 | A1* | 1/2016 | Krishnamoorthy | H04B 1/707 |
| | | | | 455/423 |
| 2016/0087746 | A1 | 3/2016 | Yamauchi et al. | |
| 2016/0302246 | A1* | 10/2016 | Chervyakov | H04L 5/1469 |
| 2017/0325225 | A1* | 11/2017 | Dinan | H04W 16/14 |
| 2018/0098298 | A1* | 4/2018 | Jung | H04L 5/0048 |
| 2019/0223178 | A1* | 7/2019 | Bergstrom | H04W 56/0045 |

FOREIGN PATENT DOCUMENTS

| | | | | |
|---|---|---|---|---|
| CN | 106538039 A | 3/2017 | | |
| EP | 2804439 A1 * | 11/2014 | | H04W 72/042 |
| WO | 2018060980 A1 | 4/2018 | | |

OTHER PUBLICATIONS

PCT/US2018/022409, International Search Report and Written Opinion, dated Jun. 18, 2018, 15 pages.

Huawei, Hilsilicon , "PDCCH/EPDCCH demodulation performance requirement for LAA", R4-161965, 3GPP TSG-RAN WG4 Meeting #78bis, San Jose Cabo, Mexico, Agenda Item 6.10.4, Apr. 11-15, 2016, 2 pages.

Huawei, Hisilicon , "CR on UE transmit timing requirement in R13", R4-162456, 3GPP TSG-RAN WG4 Meeting #78bis, San Jose Del Cabo, Mexico, Apr. 11-15, 2016, 4 pages.

Nokia, "Discussion on other RRM requirements for NB-IoT", R4-161795, 3GPP TSG-RAN WG4 Meeting #78bis, San Jose Del Cabo, Mexico, Agenda Item 6.13.5, Apr. 11-15, 2016, 3 pages.

* cited by examiner

SYSTEM, METHOD, AND PRODUCT FOR SELECTING TIMING INFORMATION BASED ON SUBCARRIER SPACING

RELATED APPLICATION

This application claims the benefit under 35 U.S.C. § 119(e) of U.S. Provisional Application No. 62/476,420 filed Mar. 24, 2017, which is hereby incorporated by reference herein in its entirety.

TECHNICAL FIELD

The present disclosure relates to cellular communications and more specifically to selecting cellular timing configurations.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX®); and the IEEE 802.11 standard for wireless local area networks (WLAN), which is commonly known to industry groups as Wi-Fi®. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION

Figure 1:
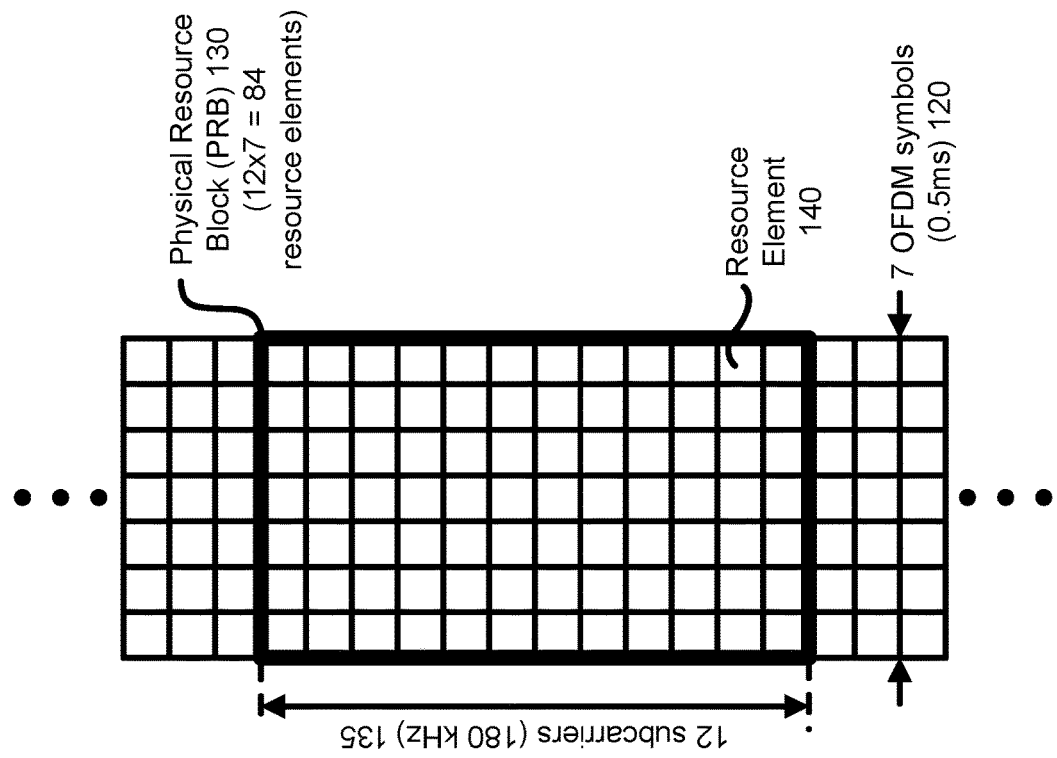
FIG. 1 is a schematic diagram illustrating the structure of a long term evolution (LTE) communication frame consistent with embodiments disclosed herein.
Figure 1:
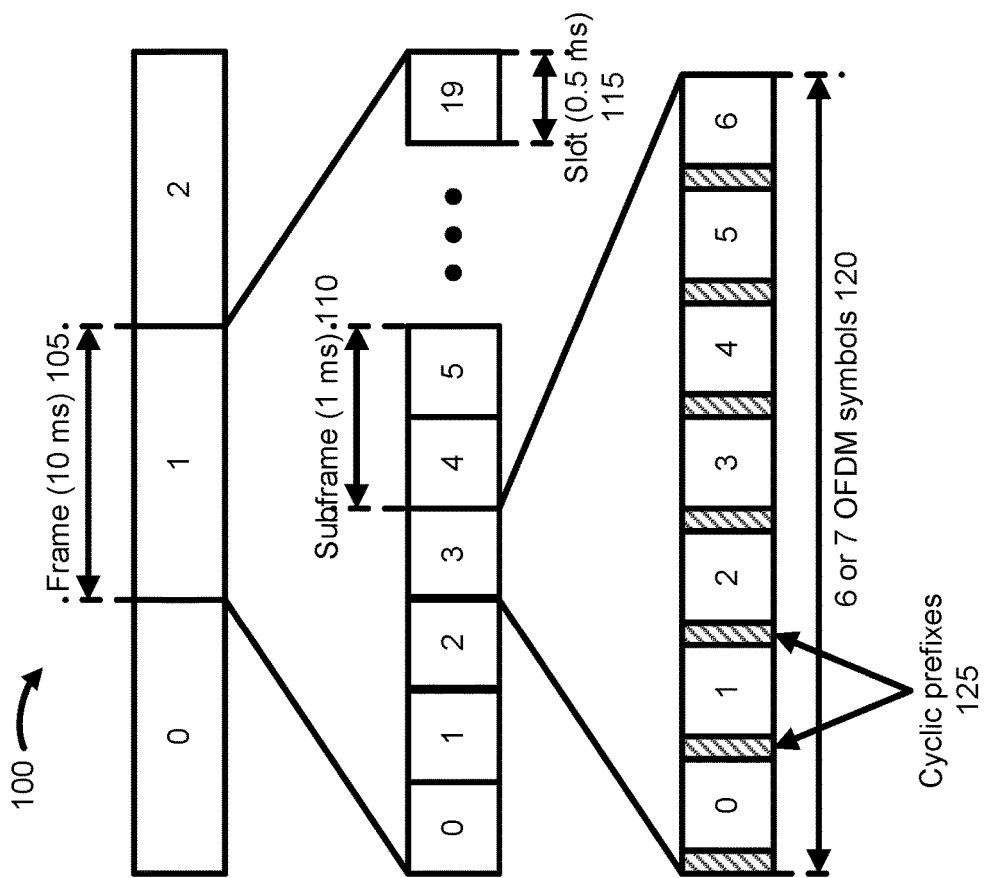

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a UE to perform autonomous time adjustment, and select a Timing Error Limit (i.e. $T_{e\_NR}$) and Maximum Autonomous Time Adjustment Step (i.e. $T_{q\_NR}$) based on bandwidth (BW) and subcarrier spacing (SCS). In one embodiment, given a certain downlink BW, if the SCS=x (kHz) and the $T_{e\_NR}$ of this SCS is N, then the $T_{e\_NR}$ of SCS=x/2 (kHz) is 2*N. Given a certain downlink BW, if the SCS=x(kHz) and the $T_{e\_NR}$ of this SCS is N, then the $T_{e\_NR}$ of SCS=2*x(kHz) is N/2. For example, given a BW=10 MHz, if the $T_{e\_NR}$ of SCS=30 kHz is $n*T_{s\_NR}$ ($T_{s\_NR}$ is the basic timing unit for NR system), then the $T_{e\_NR}$ of SCS=60 kHz is $N/2*T_{s\_NR}$, and the $T_{e\_NR}$ of SCS=15 kHz is $2*N*T_{s\_NR}$.

In other embodiments, L, which can be 0 or a fixed margin, can be used and/or scaled with N. In yet other embodiments, $T_{e\_NR}$ can be determined from a table when SCS is equal to or between two constraints.

The LTE UE has capability to automatically adjust its transmission (Tx) timing based on the receive (Rx) timing and estimated Tx timing. For example, the UE initial transmission timing error shall be less than or equal to $\pm T_e$ where the Timing Error Limit value $T_e$ is specified in the table below. This can apply when it is the first transmission in a discontinuous reception (DRX), extended connected DRX (eDRX_CONN) cycle for physical uplink control channel (PUCCH), physical uplink shared channel (PUSCH) and sounding reference signal (SRS) or it is the first transmission after random access channel (RACH)-less handover or it is the physical random access channel (PRACH) transmission. The reference point for the UE initial transmit timing control can be the downlink timing of the reference cell minus $(N_{TA\_Ref}+N_{TA\_offset}) \times T_s$. The downlink timing is defined as the time when the first detected path (in time) of the corresponding downlink frame is received from the reference cell. Timing reference ($N_{TA\_Ref}$) for PRACH is defined as 0. ($N_{TA\_Ref}+N_{TA\_offset}$(in $T_s$ units) for other channels is the difference between UE transmission timing and the downlink timing immediately after when the last timing advance was applied. $N_{TA\_Ref}$ for other channels is not changed until the next timing advance is received.

$T_e$ Timing Error Limit

| Downlink Bandwidth (MHz) | $T_e$ |
|---|---|
| 1.4 | $24 * T_S$ |
| ≥3 | $12 * T_S$ |

Note:
$T_S$ is the basic timing unit defined in TS 36.211

When it is not the first transmission in a DRX or eDRX_CONN cycle or there is no DRX or no eDRX_CONN cycle, and when it is the transmission for PUCCH, PUSCH and SRS transmission or it is not the first transmission after RACH-less handover, the UE shall be capable of changing the transmission timing according to the received downlink frame of the reference cell except when a timing advance is applied.

When in a timing advance group (TAG) the transmission timing error between the UE and the reference timing exceeds±$T_e$, or in a sTAG the UE changes the downlink SCell for deriving the UE transmit timing for cells in the secondary TAG (sTAG) configured with one or two uplinks, the UE adjusts its timing to within ±$T_e$ in that TAG, as long as the UE is configured with a primary TAG (pTAG) and one or two sTAGs, the transmission timing difference between TAGs does not exceed the maximum transmission timing difference (i.e., 32.47 μs) after such adjustment, or the UE is configured with synchronous dual connectivity, the transmission timing difference between pTAG and sTAG does not exceed the maximum transmission timing difference (i.e., 35.21 μs) after such adjustment.

If the transmission timing difference after such adjustment is bigger than the maximum transmission timing difference, the UE may stop adjustment in this TAG. The reference timing shall be $(N_{TA\_Ref}+N_{TAoffset}) \times T_s$ before the downlink timing of the reference cell. All adjustments made to the UE uplink timing under the above mentioned scenarios shall follow these rules: (1) the maximum amount of the magnitude of the timing change in one adjustment shall be $T_q$ seconds; (2) the minimum aggregate adjustment rate shall be $7*T_S$ per second; and (3) the maximum aggregate adjustment rate shall be $T_q$ per 200 ms, where the Maximum Autonomous Time Adjustment Step $T_q$ is specified in the Table below.

$T_q$ Maximum Autonomous Time Adjustment Step

| Downlink Bandwidth (MHz) | $T_q$ |
|---|---|
| 1.4 | $17.5 * T_S$ |
| 3 | $9.5 * T_S$ |
| 5 | $5.5 * T_S$ |
| ≥10 | $3.5 * T_S$ |

Note:
$T_S$ is the basic timing unit defined in TS 36.211

$T_e$ is the Timing Error Limit used to trigger the autonomous time adjustment at the UE, and $T_q$ is the Maximum Autonomous Time Adjustment Step. In LTE both $T_e$ and $T_q$ are related with BW as shown in the above tables.

In NR systems, the UE is also capable of performing the autonomous time adjustment, and it can determine or select the Timing Error Limit (i.e. $T_{e\_NR}$) and Maximum Autonomous Time Adjustment Step (i.e. $T_{q\_NR}$). However in NR systems, besides the BW there is another dimension of subcarrier spacing (SCS), and the new design of $T_{e\_NR}$ and $T_{q\_NR}$ consider the SCS as well as the BW.

The system for determining a Timing Error Limit or a Maximum Autonomous Time Adjustment Step can be determined as outlined in the following embodiments. However, it should be recognized that the embodiments may stand alone or may be combined. For example, a first embodiment may be used for a set of SCS values above a threshold and a second embodiment may be used for a set of SCS values below a threshold. In addition, an embodiment used to select a Timing Error Limit can be combined with an embodiment to select a Maximum Autonomous Time Adjustment Step in a different manner.

Embodiment 1: Timing Error Limit(i.e. $T_{e\_NR}$) may be designed differently according to different SCS. Given a certain downlink BW, if the SCS=x(kHz) and the $T_{e\_NR}$ of this SCS is N, then the $T_{e\_NR}$ of SCS=x/2 (kHz) is 2*N. Given a certain downlink BW, if the SCS=x(kHz) and the $T_{e\_NR}$ of this SCS is N, then the $T_{e\_NR}$ of SCS=2*x(kHz) is N/2.

For example, given a BW=10 MHz, if the $T_{e\_NR}$ of SCS=30 kHz is $n*T_{s\_NR}$ ($T_{S\_NR}$ is the basic timing unit for NR system), then the $T_{e\_NR}$ of SCS=60 kHz is $n/2*T_{s\_NR}$, and the $T_{e\_NR}$ of SCS=15 kHz is $2*n*T_{s\_NR}$.

Embodiment 2: Timing Error Limit (i.e. $T_{e\_NR}$) may be designed differently according to different SCS. Given a certain downlink BW, if the SCS=x(kHz) and the $T_{e\_NR}$ of this SCS is N+L, then the $T_{e\_NR}$ of SCS=x/2 (kHz) is 2*N+L; L is a fixed margin. Given a certain downlink BW, if the SCS=x(kHz) and the $T_{e\_NR}$ of this SCS is N+L, then the $T_{e\_NR}$ of SCS=2*x(kHz) is N/2+L; L is a fixed margin.

For example, given a BW=10 MHz, if the $T_{e\_NR}$ of SCS=30 kHz is $(N+L)*T_{s\_NR}$, then the $T_{e\_NR}$ of SCS=60 kHz is $(N/2+L)*T_{s\_NR}$, and the $T_{e\_NR}$ of SCS=15 kHz is $(2*N+L)*T_{s\_NR}$.

$T_{e\_NR}$ Timing Error Limit

| SCS (kHz) | $T_{e\_NR}$ |
|---|---|
| 15 | $(2 * N + L) * T_{S\_NR}$ |
| 30 | $(N + L) * T_{S\_NR}$ |
| ≥60 | $(N/2 + L) * T_{S\_NR}$ |

Note:
$T_{S\_NR}$ is the basic timing unit for NR system
Note:
L is a fixed value Embodiment 3: Timing Error Limit (i.e. $T_{e\_NR}$) may be designed differently according to different SCS. Given a certain downlink BW, if the SCS=x(kHz) and the $T_{e\_NR}$ of this SCS is N+L, then the $T_{e\_NR}$ of SCS=x/2 (kHz) is 2*N+2*L; L is an SCS specific margin, e.g. L=N/2. Given a certain downlink BW, if the SCS=x(kHz) and the $T_{e\_NR}$ of this SCS is N+L, then the $T_{e\_NR}$ of SCS=2*x(kHz) is N/2+L/2; L is an SCS specific margin, e.g. L=N/2.

For example, given a BW=10 MHz, if the $T_{e\_NR}$ of SCS=30 kHz is $(N+L)*T_{s\_NR}$, then the $T_{e\_NR}$ of SCS=60 kHz is $(N/2+L/2)*T_{s\_NR}$, and the $T_{e\_NR}$ of SCS=15 kHz is $(2*N+2*L)*T_{s\_NR}$; here the 1 may be equivalent to N/2.

Embodiment 4: Timing Error Limit (i.e. $T_{e\_NR}$) may be designed differently according to different SCS, but the same $T_{e\_NR}$ may be applied for some of the SCS levels. Given a certain downlink BW, the SCS range is from x to y(kHz) and the $T_{e\_NR}$ of this SCS range may be implemented as a same value: N.

For example, a table can be computed as shown below:

| $T_{e\_NR}$ Timing Error Limit | |
|---|---|
| Subcarrier spacing (kHz) | $T_{e\_NR}$ |
| 15 | N1 * $T_{S\_NR}$ |
| 30 | N2 * $T_{S\_NR}$ |
| ≥60 | N3 * $T_{S\_NR}$ |

Note:
$T_{S\_NR}$ is the basic timing unit for NR system
Note:
N1 > N2 > N3

Embodiment 5: Maximum Autonomous Time Adjustment Step (i.e. $T_{q\_NR}$) may be designed differently according to different SCS. Given a certain downlink BW, if the SCS=x (kHz) and the $T_{q\_NR}$ of this SCS is N, then the $T_{q\_NR}$ of SCS=x/2 (kHz) is 2*N. Given a certain downlink BW, if the SCS=x(kHz) and the $T_{q\_NR}$ of this SCS is N, then the $T_{q\_NR}$ of SCS=2*x(kHz) is N/2.

For example, given a BW=10 MHz, if the $T_{q\_NR}$ of SCS=30 kHz is n*$T_{s\_NR}$, then the $T_{q\_NR}$ of SCS=60 kHz is N/2*$T_{s\_NR}$, and the $T_{q\_NR}$ of SCS=15 kHz is 2*N*$T_{s\_NR}$.

Embodiment 6: Maximum Autonomous Time Adjustment Step (i.e. $T_{q\_NR}$) may be designed differently according to different SCS. Given a certain downlink BW, if the SCS=x (kHz) and the $T_{q\_NR}$ of this SCS is N+L, then the $T_{q\_NR}$ of SCS=x/2 (kHz) is 2*N+L; L is a fixed margin. Given a certain downlink BW, if the SCS=x(kHz) and the $T_{q\_NR}$ of this SCS is N+L, then the $T_{q\_NR}$ of SCS=2*x(kHz) is N/2+L; L is a fixed margin.

For example, given a BW=10 MHz, if the $T_{q\_NR}$ of SCS=30 kHz is (N+L)*$T_{s\_NR}$, then the $T_{q\_NR}$ of SCS=60 kHz is (N/2+L)*$T_{S\_NR}$, and the $T_{q\_NR}$ of SCS=15 kHz is (2*N+L)*$T_{s\_NR}$.

| $T_{q\_NR}$ Maximum Autonomous Time Adjustment Step | |
|---|---|
| SCS (kHz) | $T_{q\_NR}$ |
| 15 | (2 * N + L) * $T_{S\_NR}$ |
| 30 | (N + L) * $T_{S\_NR}$ |
| ≥60 | (N/2 + L) * $T_{S\_NR}$ |

Note:
$T_{S\_NR}$ is the basic timing unit for NR system
Note:
L is a fixed value Embodiment 7: Maximum Autonomous Time Adjustment Step (i.e. $T_{q\_NR}$) may be designed differently according to different SCS. Given a certain downlink BW, if the SCS=x (kHz) and the $T_{q\_NR}$ of this SCS is N+L, then the $T_{q\_R}$ of SCS=x/2 (kHz) is 2*N+2*L; L is an SCS specific margin, e.g. L=N/2. Given a certain downlink BW, if the SCS=x (kHz) and the $T_{q\_NR}$ of this SCS is N+L, then the $T_{q\_NR}$ of SCS=2*x(kHz) is N/2+L/2; L is an SCS specific margin, e.g. L=N/2.

For example, given a BW=10 MHz, if the $T_{q\_NR}$ of SCS=30 kHz is (N+L)*$T_{s\_NR}$, then the $T_{q\_NR}$ of SCS=60 kHz is (N/2+L/2)*$T_{s\_NR}$, and the $T_{q\_NR}$ of SCS=15 kHz is (2*N+2*L)*$T_{s\_NR}$; here the 1 may be equivalent to N/2.

Embodiment 8: Maximum Autonomous Time Adjustment Step (i.e. $T_{q\_NR}$) may be designed differently according to different SCS, but the same $T_{q\_NR}$ may be applied for some of the SCS levels. Given a certain downlink BW, the SCS range is from x to y(kHz) and the $T_{q\_NR}$ of this SCS range may be implemented as a same value: N.

For example, the $T_{q\_NR}$ can be selected as shown in the table below:

| $T_{q\_NR}$ Maximum Autonomous Time Adjustment Step | |
|---|---|
| SCS (kHz) | $T_{q\_NR}$ |
| 15 | N1 * $T_{S\_NR}$ |
| 30 | N2 * $T_{S\_NR}$ |
| ≥60 | N3 * $T_{S\_NR}$ |

Note:
$T_{S\_NR}$ is the basic timing unit for NR system
Note:
N1 > N2 > N3

Embodiment 9: Timing Error Limit (i.e. $T_{e\_NR}$) may be designed differently according to different SCS. Given a certain downlink BW, a larger SCS level may have a smaller $T_{e\_NR}$, and a smaller SCS level may have a larger $T_{e\_NR}$.

For example, $T_{e\_NR}$ can be selected as shown in the table below:

| $T_{e\_NR}$ Timing Error Limit | |
|---|---|
| Subcarrier spacing (kHz) | $T_{e\ NR}$ |
| 15 | N1*$T_{S\ NR}$ |
| 30 | N2*$T_{S\ NR}$ |
| 60 | N3*$T_{S\ NR}$ |

Note:
$T_{S\ NR}$ is the basic timing unit for NR system
Note:
N1 > N2 > N3

Embodiment 10: Maximum Autonomous Time Adjustment Step (i.e. $T_{q\_NR}$) may be designed differently according to different SCS. Given a certain downlink BW, a larger SCS level may have a smaller $T_{q\_NR}$, and a smaller SCS level may have a larger $T_{q\_NR}$.

For example, $T_{q\_NR}$ can be selected as shown in the table below:

| $T_{q\_NR}$ Maximum Autonomous Time Adjustment Step | |
|---|---|
| SCS (kHz) | $T_{q\_NR}$ |
| 15 | N1 * $T_{S\_NR}$ |
| 30 | N2 * $T_{S\_NR}$ |
| 60 | N3 * $T_{S\_NR}$ |

Note:
$T_{S\_NR}$ is the basic timing unit for NR system
Note:
N1 > N2 > N3

FIG. 1 is a schematic diagram 100 illustrating the structure of an LTE communication frame 105. The frame 105 has a duration of 10 milliseconds (ms). The frame 105 includes 10 subframes 110, each having a duration of 1 ms. Each subframe 110 includes two slots 115, each having a duration of 0.5 ms. Therefore, the frame 105 includes 20 slots 115.

Each slot 115 includes six or seven orthogonal frequency-division multiplexing (OFDM) symbols 120. The number of OFDM symbols 120 in each slot 115 is based on the size of cyclic prefixes (CP) 125. For example, the number of OFDM symbols 120 in the slot 115 is seven in normal mode CP and six in extended mode CP.

The smallest allocable unit for transmission is a resource block 130 (i.e., physical resource block (PRB) 130). Transmissions are scheduled by the PRB 130. The PRB 130 consists of 12 consecutive subcarriers 135, or 180 kHz, for the duration of one slot 115 (0.5 ms). A resource element 140, which is the smallest defined unit, consists of one OFDM subcarrier during one OFDM symbol interval. In the case of normal mode CP, each PRB 130 consists of 12×7=84 resource elements 140. Each PRB 130 consists of 72 resource elements 140 in the case of extended mode CP (not shown).

In NR, SCS can be altered. For example, a subframe duration is fixed to 1 ms and frame length is 10 ms. Scalable numerology allows at least from 15 kHz to 480 kHz SCS. Numerologies with 15 kHz and larger SCS, regardless of CP overhead, align on symbol boundaries every 1 ms in an NR carrier.

In an embodiment, for the normal CP family, the following is adopted: For SCS of 15 kHz*$2^n$ (n is non-negative integer), each symbol length (including CP) of 15 kHz SCS equals the sum of the corresponding $2^n$ symbols of the scaled SCS. Other than the first OFDM symbol in every 0.5 ms, OFDM symbols within 0.5 ms have the same size. The first OFDM symbol in 0.5 ms is longer by $16T_s$ (assuming 15 kHz and FFT size of 2048) compared to other OFDM symbols. 16 $T_s$ is used for CP for the first symbol.

For SCS of 15 kHz*$2^n$ (n is a negative integer), each symbol length (including CP) of the SCS equals the sum of the corresponding $2^{-n}$ symbols of 15 kHz.

Figure 2:
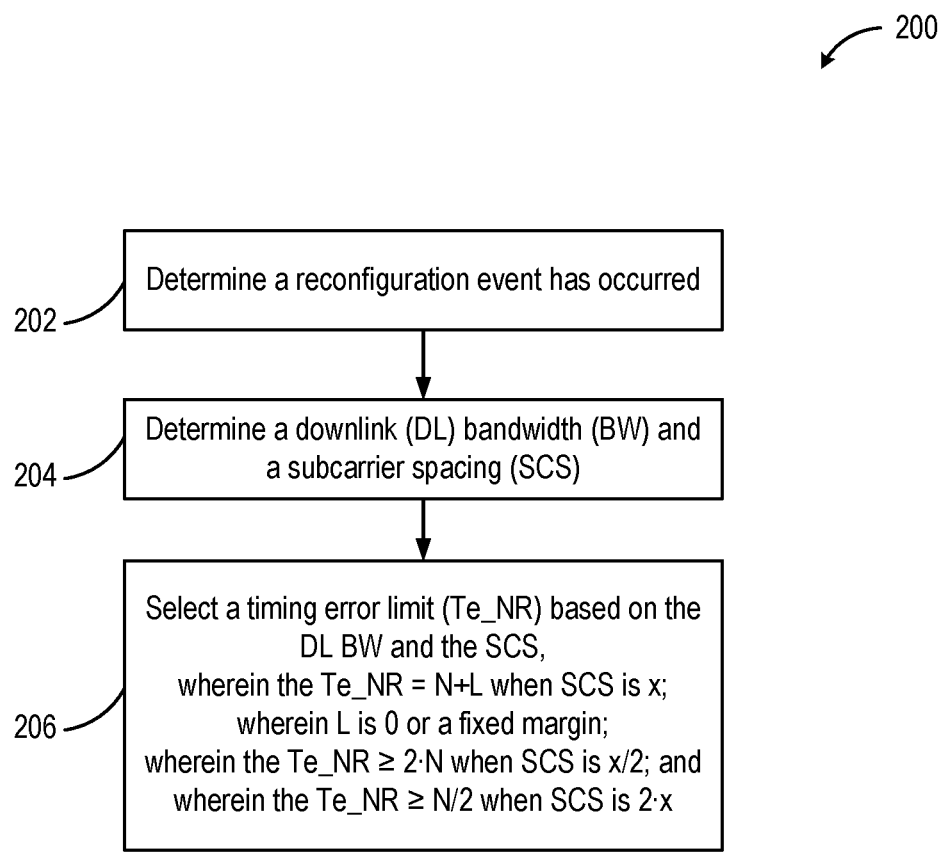
FIG. 2 is a flow chart illustrating a method for selecting a Timing Error Limit consistent with embodiments disclosed herein.

FIG. 2 is a flow chart illustrating a method 200 for selecting a Timing Error Limit. The method 200 can be accomplished by systems such as those shown in FIG. 3, including a UE 301 and a UE 302. In block 202, the UE determines a reconfiguration event has occurred. In block 204, the UE determines a downlink (DL) bandwidth (BW) and a subcarrier spacing (SCS). In block 206, the UE selects a Timing Error Limit ($T_{e\_NR}$) based on the DL BW and the SCS, wherein the $T_{e\_NR}$=N+L when SCS is x; wherein L is 0 or a fixed margin; wherein the $T_{e\_NR} \geq 2 \cdot N$ when SCS is x/2; and wherein the $$T_{e\_NR} \geq \frac{N}{2}$$

when SCS is 2·x.

Figure 3:
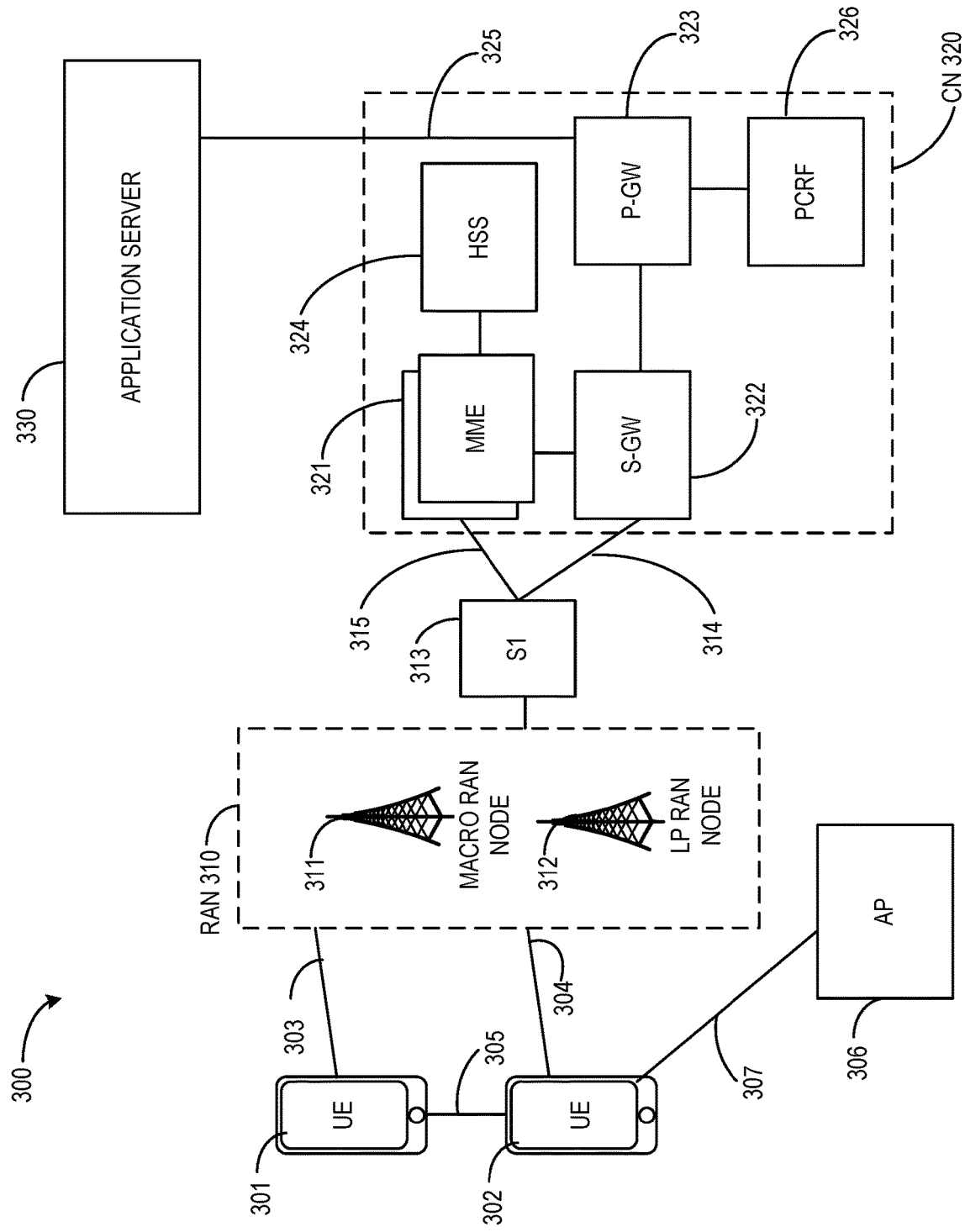
FIG. 3 illustrates an architecture of a system of a network consistent with embodiments disclosed herein.

FIG. 3 illustrates an architecture of a system 300 of a network in accordance with some embodiments. The system 300 is shown to include a user equipment (UE) 301 and a UE 302. The UEs 301 and 302 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 301 and 302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 and 302 may be configured to connect, e.g., communicatively couple, with a radio access network (RAN) 310. The RAN 310 may be, for example, an Evolved Universal Mobile Telecommunications System (UMTS) Terrestrial Radio Access Network (E-UTRAN), a NextGen RAN (NG RAN), or some other type of RAN. The UEs 301 and 302 utilize connections 303 and 304, respectively, each of which comprises a physical communications interface or layer (discussed in further detail below); in this example, the connections 303 and 304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 301 and 302 may further directly exchange communication data via a ProSe interface 305. The ProSe interface 305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 302 is shown to be configured to access an access point (AP) 306 via connection 307. The connection 307 can comprise a local wireless connection, such as a connection consistent with any IEEE 802.11 protocol, wherein the AP 306 would comprise a wireless fidelity (WiFi®) router. In this example, the AP 306 may be connected to the Internet without connecting to the core network of the wireless system (described in further detail below).

The RAN 310 can include one or more access nodes that enable the connections 303 and 304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 310 may include one or more RAN nodes for providing macrocells, e.g., macro RAN node 311, and one or more RAN nodes for providing femtocells or picocells (e.g., cells having smaller coverage areas, smaller user capacity, or higher bandwidth compared to macrocells), e.g., low power (LP) RAN node 312.

Any of the RAN nodes 311 and 312 can terminate the air interface protocol and can be the first point of contact for the UEs 301 and 302. In some embodiments, any of the RAN nodes 311 and 312 can fulfill various logical functions for the RAN 310 including, but not limited to, radio network controller (RNC) functions such as radio bearer management, uplink and downlink dynamic radio resource management and data packet scheduling, and mobility management.

In accordance with some embodiments, the UEs 301 and 302 can be configured to communicate using Orthogonal Frequency-Division Multiplexing (OFDM) communication signals with each other or with any of the RAN nodes 311 and 312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 and 312 to the UEs 301 and 302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 301 and 302. The physical downlink control channel (PDCCH) may carry information about the transport format and resource allocations related to the PDSCH channel, among other things. It may also inform the UEs 301 and 302 about the transport format, resource allocation, and H-ARQ (Hybrid Automatic Repeat Request) information related to the uplink shared channel. Typically, downlink scheduling (assigning control and shared channel resource blocks to the UE 302 within a cell) may be performed at any of the RAN nodes 311 and 312 based on channel quality information fed back from any of the UEs 301 and 302. The downlink resource assignment information may be sent on the PDCCH used for (e.g., assigned to) each of the UEs 301 and 302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 310 is shown to be communicatively coupled to a core network (CN) 320—via an S1 interface 313. In embodiments, the CN 320 may be an evolved packet core (EPC) network, a NextGen Packet Core (NPC) network, or some other type of CN. In this embodiment the S1 interface 313 is split into two parts: the S1-U interface 314, which carries traffic data between the RAN nodes 311 and 312 and a serving gateway (S-GW) 322, and an S1-mobility management entity (MME) interface 315, which is a signaling interface between the RAN nodes 311 and 312 and MMEs 321.

In this embodiment, the CN 320 comprises the MMEs 321, the S-GW 322, a Packet Data Network (PDN) Gateway (P-GW) 323, and a home subscriber server (HSS) 324. The MMEs 321 may be similar in function to the control plane of legacy Serving General Packet Radio Service (GPRS) Support Nodes (SGSN). The MMEs 321 may manage mobility aspects in access such as gateway selection and tracking area list management. The HSS 324 may comprise a database for network users, including subscription-related information to support the network entities' handling of communication sessions. The CN 320 may comprise one or several HSSs 324, depending on the number of mobile subscribers, on the capacity of the equipment, on the organization of the network, etc. For example, the HSS 324 can provide support for routing/roaming, authentication, authorization, naming/addressing resolution, location dependencies, etc.

The S-GW 322 may terminate the S1 interface 313 towards the RAN 310, and routes data packets between the RAN 310 and the CN 320. In addition, the S-GW 322 may be a local mobility anchor point for inter-RAN node handovers and also may provide an anchor for inter-3GPP mobility. Other responsibilities may include lawful intercept, charging, and some policy enforcement.

The P-GW 323 may terminate an SGi interface toward a PDN. The P-GW 323 may route data packets between the CN 320 (e.g., an EPC network) and external networks such as a network including the application server 330 (alternatively referred to as application function (AF)) via an Internet Protocol (IP) interface 325. Generally, an application server 330 may be an element offering applications that use IP bearer resources with the core network (e.g., UMTS Packet Services (PS) domain, LTE PS data services, etc.). In this embodiment, the P-GW 323 is shown to be communicatively coupled to an application server 330 via an IP communications interface 325. The application server 330 can also be configured to support one or more communication services (e.g., Voice-over-Internet Protocol (VoIP) sessions, PTT sessions, group communication sessions, social networking services, etc.) for the UEs 301 and 302 via the CN 320.

The P-GW 323 may further be a node for policy enforcement and charging data collection. A Policy and Charging Enforcement Function (PCRF) 326 is the policy and charging control element of the CN 320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 326 may be communicatively coupled to the application server 330 via the P-GW 323. The application server 330 may signal the PCRF 326 to indicate a new service flow and select the appropriate Quality of Service (QoS) and charging parameters. The PCRF 326 may provision this rule into a Policy and Charging Enforcement Function (PCEF) (not shown) with the appropriate traffic flow template (TFT) and QoS class of identifier (QCI), which commences the QoS and charging as specified by the application server 330.

Figure 4:
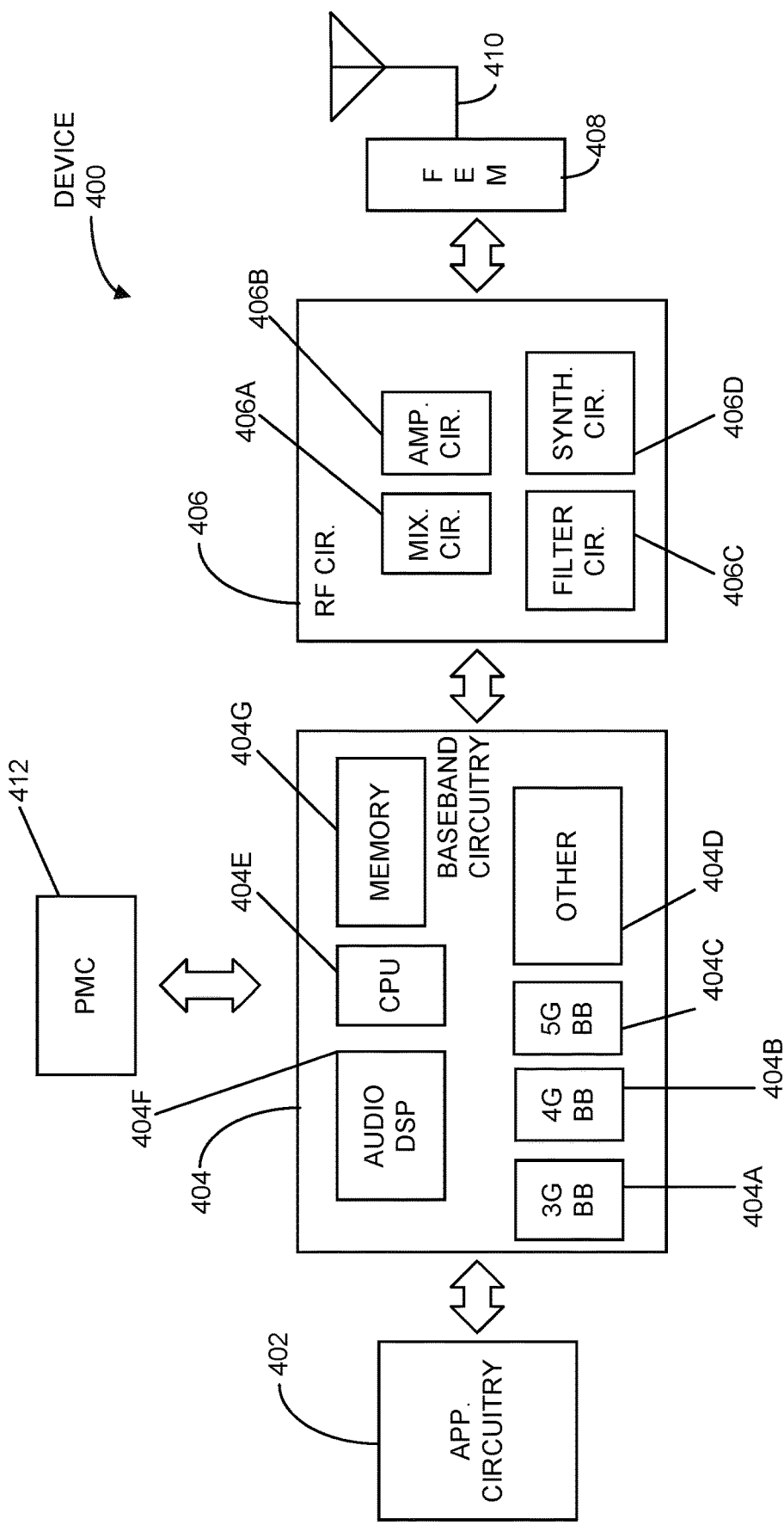
FIG. 4 illustrates example components of a device consistent with embodiments disclosed herein.

FIG. 4 illustrates example components of a device 400 in accordance with some embodiments. In some embodiments, the device 400 may include application circuitry 402, baseband circuitry 404, Radio Frequency (RF) circuitry 406, front-end module (FEM) circuitry 408, one or more antennas 410, and power management circuitry (PMC) 412 coupled together at least as shown. The components of the illustrated device 400 may be included in a UE or a RAN node. In some embodiments, the device 400 may include fewer elements (e.g., a RAN node may not utilize application circuitry 402, and instead include a processor/controller to process IP data received from an EPC). In some embodiments, the device 400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 402 may include one or more application processors. For example, the application circuitry 402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 400. In some embodiments, processors of application circuitry 402 may process IP data packets received from an EPC.

The baseband circuitry 404 may include circuitry such as, but not limited to, one or more single-core or multi-core processors. The baseband circuitry 404 may include one or more baseband processors or control logic to process baseband signals received from a receive signal path of the RF circuitry 406 and to generate baseband signals for a transmit signal path of the RF circuitry 406. Baseband processing circuity 404 may interface with the application circuitry 402 for generation and processing of the baseband signals and for controlling operations of the RF circuitry 406. For example, in some embodiments, the baseband circuitry 404 may include a third generation (3G) baseband processor 404A, a fourth generation (4G) baseband processor 404B, a fifth generation (5G) baseband processor 404C, or other baseband processor(s) 404D for other existing generations, generations in development or to be developed in the future (e.g., second generation (2G), sixth generation (6G), etc.). The baseband circuitry 404 (e.g., one or more of baseband processors 404A-D) may handle various radio control functions that enable communication with one or more radio networks via the RF circuitry 406. In other embodiments, some or all of the functionality of baseband processors 404A-D may be included in modules stored in the memory 404G and executed via a Central Processing Unit (CPU) 404E. The radio control functions may include, but are not limited to, signal modulation/demodulation, encoding/decoding, radio frequency shifting, etc. In some embodiments, modulation/demodulation circuitry of the baseband circuitry 404 may include Fast-Fourier Transform (FFT), precoding, or constellation mapping/demapping functionality. In some embodiments, encoding/decoding circuitry of the baseband circuitry 404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 404 may include one or more audio digital signal processor(s) (DSP) 404F. The audio DSP(s) 404F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 404 and the application circuitry 402 may be implemented together such as, for example, on a system on a chip (SOC).

In some embodiments, the baseband circuitry 404 may provide for communication compatible with one or more radio technologies. For example, in some embodiments, the baseband circuitry 404 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 404 is configured to support radio communications of more than one wireless protocol may be referred to as multi-mode baseband circuitry.

RF circuitry 406 may enable communication with wireless networks using modulated electromagnetic radiation through a non-solid medium. In various embodiments, the RF circuitry 406 may include switches, filters, amplifiers, etc. to facilitate the communication with the wireless network. The RF circuitry 406 may include a receive signal path which may include circuitry to down-convert RF signals received from the FEM circuitry 408 and provide baseband signals to the baseband circuitry 404. RF circuitry 406 may also include a transmit signal path which may include circuitry to up-convert baseband signals provided by the baseband circuitry 404 and provide RF output signals to the FEM circuitry 408 for transmission.

In some embodiments, the receive signal path of the RF circuitry 406 may include mixer circuitry 406A, amplifier circuitry 406B and filter circuitry 406C. In some embodiments, the transmit signal path of the RF circuitry 406 may include filter circuitry 406C and mixer circuitry 406A. RF circuitry 406 may also include synthesizer circuitry 406D for synthesizing a frequency for use by the mixer circuitry 406A of the receive signal path and the transmit signal path. In some embodiments, the mixer circuitry 406A of the receive signal path may be configured to down-convert RF signals received from the FEM circuitry 408 based on the synthesized frequency provided by synthesizer circuitry 406D. The amplifier circuitry 406B may be configured to amplify the down-converted signals and the filter circuitry 406C may be a low-pass filter (LPF) or band-pass filter (BPF) configured to remove unwanted signals from the down-converted signals to generate output baseband signals.

Output baseband signals may be provided to the baseband circuitry 404 for further processing. In some embodiments, the output baseband signals may be zero-frequency baseband signals, although this is not a requirement. In some embodiments, the mixer circuitry 406A of the receive signal path may comprise passive mixers, although the scope of the embodiments is not limited in this respect.

In some embodiments, the mixer circuitry 406A of the transmit signal path may be configured to up-convert input baseband signals based on the synthesized frequency provided by the synthesizer circuitry 406D to generate RF output signals for the FEM circuitry 408. The baseband signals may be provided by the baseband circuitry 404 and may be filtered by the filter circuitry 406C.

In some embodiments, the mixer circuitry 406A of the receive signal path and the mixer circuitry 406A of the transmit signal path may include two or more mixers and may be arranged for quadrature downconversion and upconversion, respectively. In some embodiments, the mixer circuitry 406A of the receive signal path and the mixer circuitry 406A of the transmit signal path may include two or more mixers and may be arranged for image rejection (e.g., Hartley image rejection). In some embodiments, the mixer circuitry 406A of the receive signal path and the mixer circuitry 406A may be arranged for direct downconversion and direct upconversion, respectively. In some embodiments, the mixer circuitry 406A of the receive signal path and the mixer circuitry 406A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 406 may include analog-to-digital converter (ADC) and digital-to-analog converter (DAC) circuitry and the baseband circuitry 404 may include a digital baseband interface to communicate with the RF circuitry 406.

In some dual-mode embodiments, a separate radio IC circuitry may be provided for processing signals for each spectrum, although the scope of the embodiments is not limited in this respect.

In some embodiments, the synthesizer circuitry 406D may be a fractional-N synthesizer or a fractional N/N+1 synthesizer, although the scope of the embodiments is not limited in this respect as other types of frequency synthesizers may be suitable. For example, synthesizer circuitry 406D may be a delta-sigma synthesizer, a frequency multiplier, or a synthesizer comprising a phase-locked loop with a frequency divider.

The synthesizer circuitry 406D may be configured to synthesize an output frequency for use by the mixer circuitry 406A of the RF circuitry 406 based on a frequency input and a divider control input. In some embodiments, the synthesizer circuitry 406D may be a fractional N/N+1 synthesizer.

In some embodiments, frequency input may be provided by a voltage controlled oscillator (VCO), although that is not a requirement. Divider control input may be provided by either the baseband circuitry 404 or the application circuitry 402 (such as an applications processor) depending on the desired output frequency. In some embodiments, a divider control input (e.g., N) may be determined from a look-up table based on a channel indicated by the application circuitry 402.

Synthesizer circuitry 406D of the RF circuitry 406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 406D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 406 may include an IQ/polar converter.

FEM circuitry 408 may include a receive signal path which may include circuitry configured to operate on RF signals received from one or more antennas 410, amplify the received signals and provide the amplified versions of the received signals to the RF circuitry 406 for further processing. The FEM circuitry 408 may also include a transmit signal path which may include circuitry configured to amplify signals for transmission provided by the RF circuitry 406 for transmission by one or more of the one or more antennas 410. In various embodiments, the amplification through the transmit or receive signal paths may be done solely in the RF circuitry 406, solely in the FEM circuitry 408, or in both the RF circuitry 406 and the FEM circuitry 408.

In some embodiments, the FEM circuitry 408 may include a TX/RX switch to switch between transmit mode and receive mode operation. The FEM circuitry 408 may include a receive signal path and a transmit signal path. The receive signal path of the FEM circuitry 408 may include an LNA to amplify received RF signals and provide the amplified received RF signals as an output (e.g., to the RF circuitry 406). The transmit signal path of the FEM circuitry 408 may include a power amplifier (PA) to amplify input RF signals (e.g., provided by the RF circuitry 406), and one or more filters to generate RF signals for subsequent transmission (e.g., by one or more of the one or more antennas 410).

In some embodiments, the PMC 412 may manage power provided to the baseband circuitry 404. In particular, the PMC 412 may control power-source selection, voltage scaling, battery charging, or DC-to-DC conversion. The PMC 412 may often be included when the device 400 is capable of being powered by a battery, for example, when the device 400 is included in a UE. The PMC 412 may increase the power conversion efficiency while providing desirable implementation size and heat dissipation characteristics.

FIG. 4 shows the PMC 412 coupled only with the baseband circuitry 404. However, in other embodiments, the PMC 412 may be additionally or alternatively coupled with, and perform similar power management operations for, other components such as, but not limited to, the application circuitry 402, the RF circuitry 406, or the FEM circuitry 408.

In some embodiments, the PMC 412 may control, or otherwise be part of, various power saving mechanisms of the device 400. For example, if the device 400 is in an RRC_Connected state, where it is still connected to the RAN node as it expects to receive traffic shortly, then it may enter a state known as Discontinuous Reception Mode (DRX) after a period of inactivity. During this state, the device 400 may power down for brief intervals of time and thus save power.

If there is no data traffic activity for an extended period of time, then the device 400 may transition off to an RRC_Idle state, where it disconnects from the network and does not perform operations such as channel quality feedback, handover, etc. The device 400 goes into a very low power state and it performs paging where again it periodically wakes up to listen to the network and then powers down again. The device 400 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 402 and processors of the baseband circuitry 404 may be used to execute elements of one or more instances of a protocol stack. For example, processors of the baseband circuitry 404, alone or in combination, may be used to execute Layer 3, Layer 2, or Layer 1 functionality, while processors of the application circuitry 402 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 5:
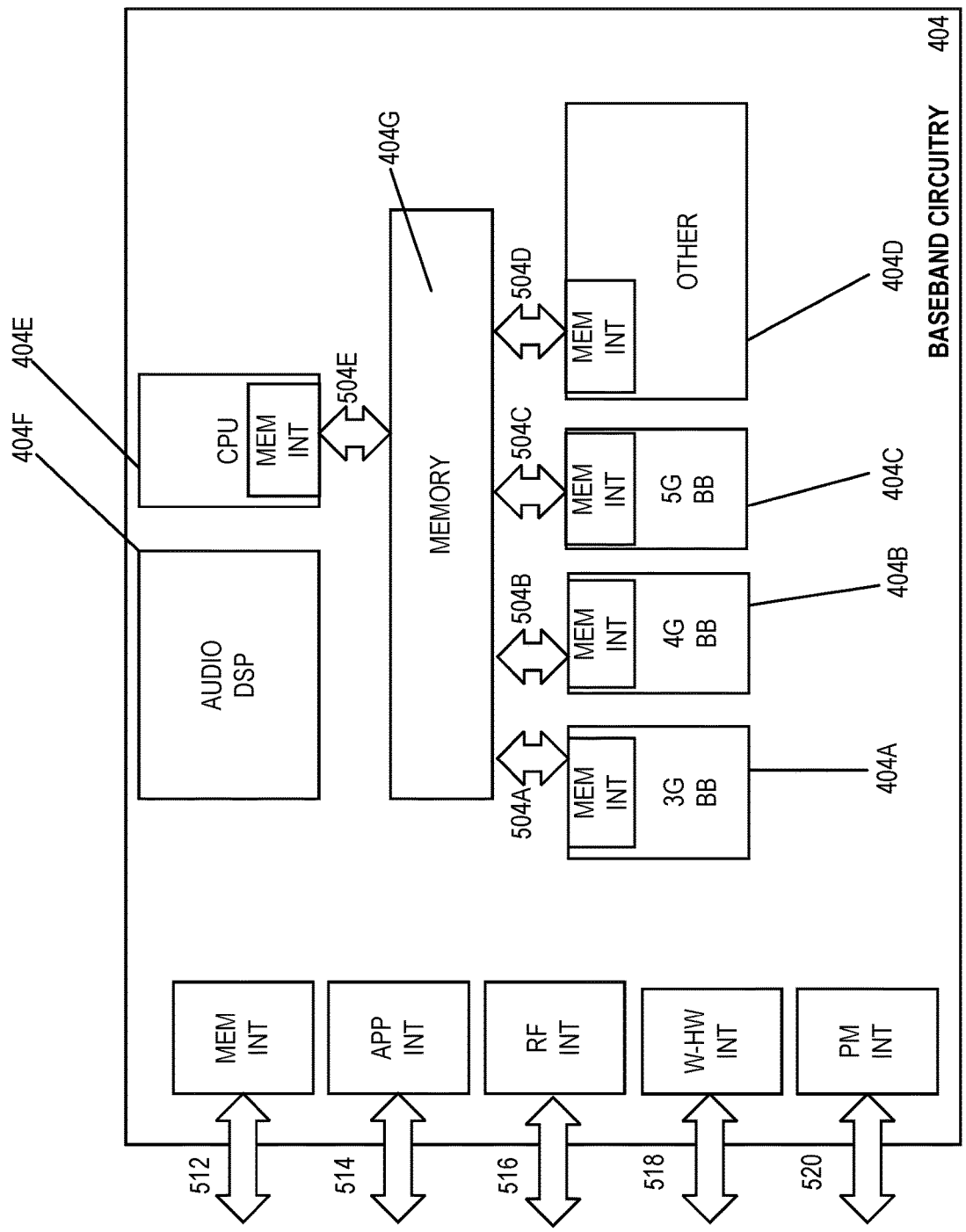
FIG. 5 illustrates example interfaces of baseband circuitry consistent with embodiments disclosed herein.

FIG. 5 illustrates example interfaces of baseband circuitry in accordance with some embodiments. As discussed above, the baseband circuitry 404 of FIG. 4 may comprise processors 404A-404E and a memory 404G utilized by said processors. Each of the processors 404A-404E may include a memory interface, 504A-504E, respectively, to send/receive data to/from the memory 404G.

The baseband circuitry 404 may further include one or more interfaces to communicatively couple to other circuitries/devices, such as a memory interface 512 (e.g., an interface to send/receive data to/from memory external to the baseband circuitry 404), an application circuitry interface 514 (e.g., an interface to send/receive data to/from the application circuitry 402 of FIG. 4), an RF circuitry interface 516 (e.g., an interface to send/receive data to/from RF circuitry 406 of FIG. 4), a wireless hardware connectivity interface 518 (e.g., an interface to send/receive data to/from Near Field Communication (NFC) components, Bluetooth® components (e.g., Bluetooth® Low Energy), Wi-Fi® components, and other communication components), and a power management interface 520 (e.g., an interface to send/receive power or control signals to/from the PMC 412.

Figure 6:
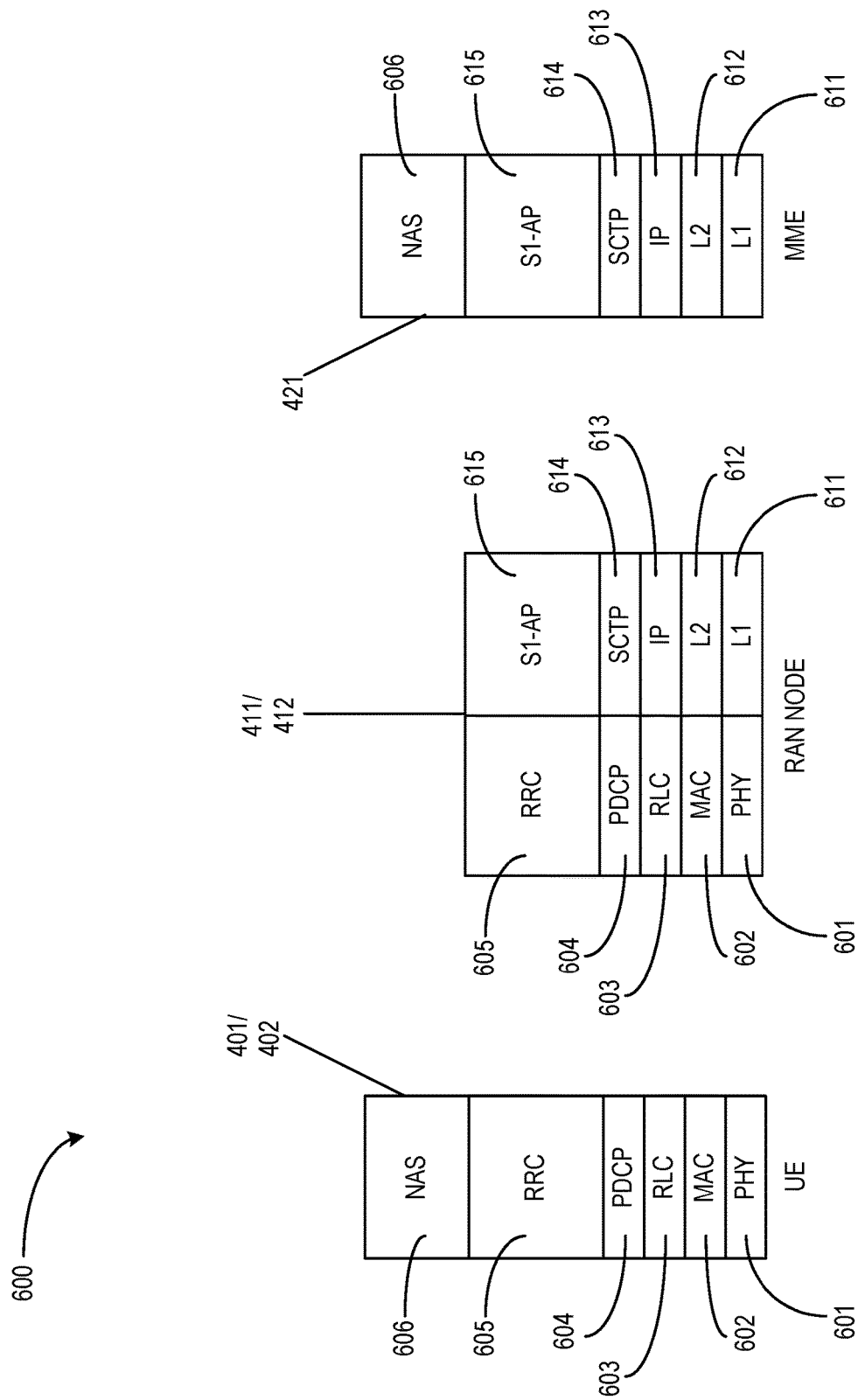
FIG. 6 is an illustration of a control plane protocol stack consistent with embodiments disclosed herein.

FIG. 6 is an illustration of a control plane protocol stack in accordance with some embodiments. In this embodiment, a control plane 600 is shown as a communications protocol stack between the UE 301 (or alternatively, the UE 302), the RAN node 311 (or alternatively, the RAN node 312), and the MME 321.

A PHY layer 601 may transmit or receive information used by the MAC layer 602 over one or more air interfaces. The PHY layer 601 may further perform link adaptation or adaptive modulation and coding (AMC), power control, cell search (e.g., for initial synchronization and handover purposes), and other measurements used by higher layers, such as an RRC layer 605. The PHY layer 601 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 602 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 603 may operate in a plurality of modes of operation, including: Transparent Mode (TM), Unacknowledged Mode (UM), and Acknowledged Mode (AM). The RLC layer 603 may execute transfer of upper layer protocol data units (PDUs), error correction through automatic repeat request (ARQ) for AM data transfers, and concatenation, segmentation and reassembly of RLC SDUs for UM and AM data transfers. The RLC layer 603 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 604 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 605 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 301 and the RAN node 311 may utilize a Uu interface (e.g., an LTE-Uu interface) to exchange control plane data via a protocol stack comprising the PHY layer 601, the MAC layer 602, the RLC layer 603, the PDCP layer 604, and the RRC layer 605.

In the embodiment shown, the non-access stratum (NAS) protocols 606 form the highest stratum of the control plane between the UE 301 and the MME 321. The NAS protocols 606 support the mobility of the UE 301 and the session management procedures to establish and maintain IP connectivity between the UE 301 and the P-GW 323.

The S1 Application Protocol (S1-AP) layer 615 may support the functions of the S1 interface and comprise Elementary Procedures (EPs). An EP is a unit of interaction between the RAN node 311 and the CN 320. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 614 may ensure reliable delivery of signaling messages between the RAN node 311 and the MME 321 based, in part, on the IP protocol, supported by an IP layer 613. An L2 layer 612 and an L1 layer 611 may refer to communication links (e.g., wired or wireless) used by the RAN node and the MME to exchange information.

The RAN node 311 and the MME 321 may utilize an S1-MME interface to exchange control plane data via a protocol stack comprising the L1 layer 611, the L2 layer 612, the IP layer 613, the SCTP layer 614, and the S1-AP layer 615.

Figure 7:
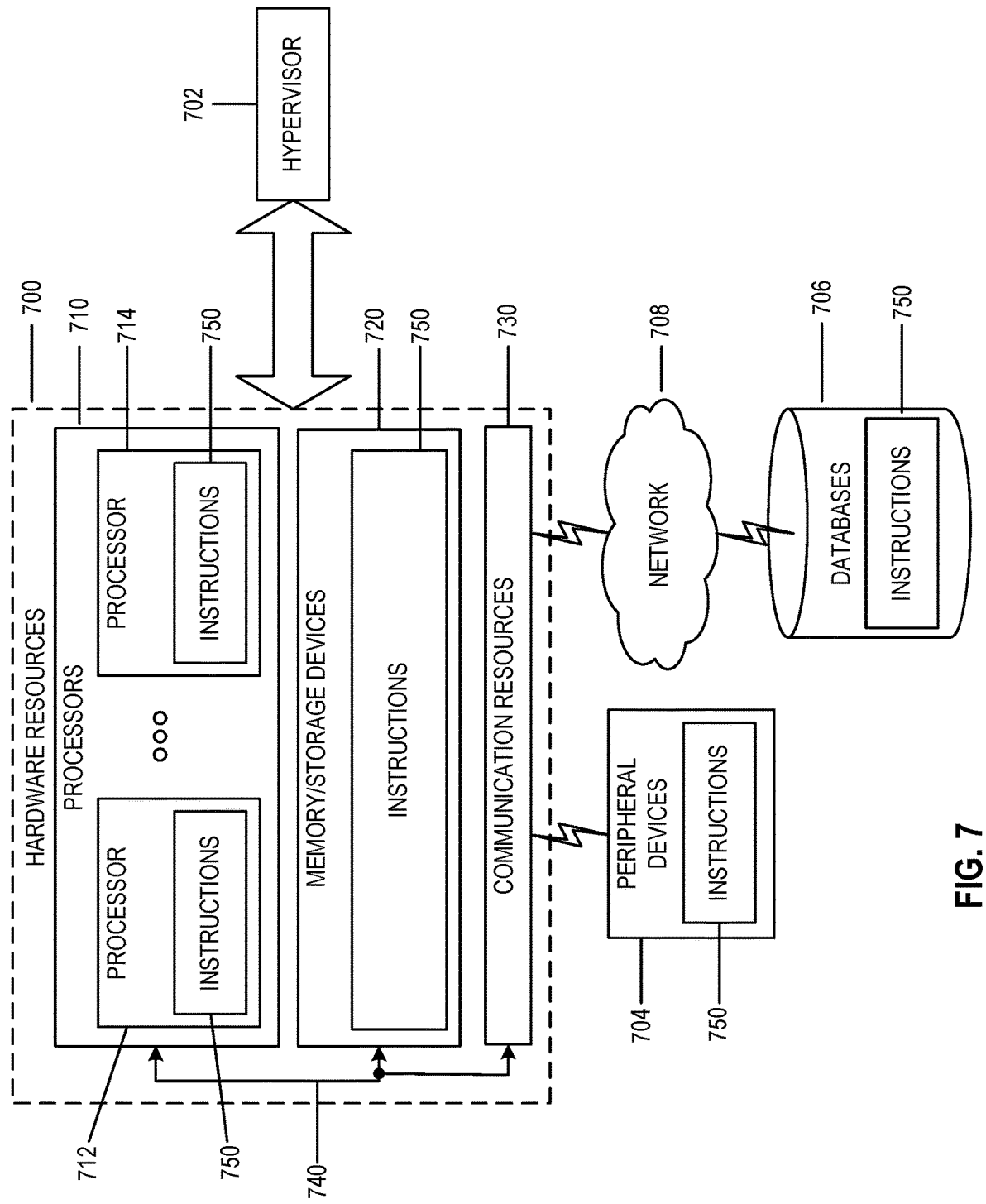
FIG. 7 is a block diagram illustrating components able to read instructions from a machine-readable or computer-readable medium and perform any one or more of the methodologies discussed herein.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 712 and a processor 714.

The memory/storage devices 720 may include main memory, disk storage, or any suitable combination thereof. The memory/storage devices 720 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

EXAMPLES

The following examples pertain to further embodiments.

Example 1 is an apparatus for a user equipment (UE), comprising: a wireless interface and a processor. The wireless interface configured to communicate with a radio access network (RAN) node. The processor is coupled to the wireless interface, and the processor configured to: determine a reconfiguration event has occurred; determine a downlink (DL) bandwidth (BW) and a subcarrier spacing (SCS); and select a timing error limit($T_{e\_NR}$) based on the DL BW and the SCS, wherein the $T_{e\_NR}$=N+L when SCS is x, wherein L is 0 or a fixed margin; wherein the $T_{e\_NR} \geq 2 \cdot N$ when SCS is $$\frac{x}{2};$$

and wherein the $$T_{e\_NR} \geq \frac{N}{2}$$

when SCS is 2·x.

Example 2 is the apparatus of Example 1, wherein reconfiguration event is a network reconfiguration.

Example 3 is the apparatus of Example 1, wherein the reconfiguration event is a mobility event.

Example 4 is the apparatus of Example 3, wherein the mobility event is a handover.

Example 5 is the apparatus of Example 1, wherein the $$T_{e\_NR} = \frac{N}{2} + L$$

when SCS is 2·x, where L is a fixed margin.

Example 6 is the apparatus of Example 1, wherein the $T_{e\_NR}=2 \cdot N+L$ when SCS is $$\frac{x}{2},$$

where L is a fixed margin.

Example 7 is the apparatus of Example 1, wherein the $$T_{e\_NR} = \frac{N}{2} + \frac{L}{2}$$

when SCS is 2·x, where L is a fixed margin.

Example 8 is the apparatus of Example 1, wherein the $T_{e\_NR}=2 \cdot N+2 \cdot L$ when SCS is $$\frac{x}{2},$$

where L is a fixed margin.

Example 9 is the apparatus of any of Examples 1-4, wherein the processor is a baseband processor.

Example 10 is a system for determining a maximum autonomous time adjustment step ($T_{q\_NR}$) comprising: storage for $T_{q\_NR}$; and a processor configured to: determine a reconfiguration event has occurred; determine a downlink (DL) bandwidth (BW) and a subcarrier spacing (SCS); and select $T_{q\_NR}$ based on the DL BW and the SCS, wherein the $T_{q\_NR}=N+L$ when SCS is x, wherein L is 0 or a fixed margin; wherein the $T_{q\_NR} \geq 2 \cdot N$ when SCS is $$\frac{x}{2};$$

and wherein the $$T_{q\_NR} \geq \frac{N}{2}$$

when SCS is 2·x.

Example 11 is the system of Example 10, wherein the system is an apparatus of a user equipment (UE).

Example 12 is the system of Example 10, wherein the reconfiguration event is a network reconfiguration.

Example 13 is the system of Example 10, wherein the reconfiguration event is a mobility event.

Example 14 is the system of Example 10, wherein the mobility event is a handover.

Example 15 is the system of Example 10, wherein the $$T_{q\_NR} = \frac{N}{2} + L$$

when SCS is 2·x, where L is a fixed margin.

Example 16 is the system of Example 10, wherein the $T_{q\_NR}=2 \cdot N+L$ when SCS is $$\frac{x}{2},$$

where L is a fixed margin.

Example 17 is the system of Example 10, wherein the $$T_{q\_NR} = \frac{N}{2} + \frac{L}{2}$$

when SCS is 2·x, where L is a fixed margin.

Example 18 is the system of Example 10, wherein the $T_{q\_NR}=2 \cdot N+2 \cdot L$ when SCS is $$\frac{x}{2},$$

where L is a fixed margin.

Example 19 is the system of any of Examples 10-18, wherein the processor is a baseband processor.

Example 20 is a computer program product comprising a computer-readable storage medium that stores instructions for execution by a processor to perform operations of a user equipment (UE), the operations, when executed by the processor, to perform a method, the method comprising: determining a reconfiguration event has occurred; determining a downlink (DL) bandwidth (BW) and a subcarrier spacing (SCS); and selecting a timing error limit($T_{e\_NR}$) based on the DL BW and the SCS, wherein the $T_{e\_NR}=(N+L) \cdot T_{S\_NR}$ when SCS is x, wherein L is 0 or a fixed margin, wherein $T_{S\_NR}$ is a basic timing unit for a new radio (NR) cellular system; wherein the $T_{e\_NR} \geq (2 \cdot N+L) \cdot T_{S\_NR}$ when SCS is $$\frac{x}{2};$$

and wherein the $$T_{e\_NR} \geq \left(\frac{N}{2} + L\right) \cdot T_{S\_NR}$$

when SCS is 2·x.

Example 21 is the computer program product of Example 20, wherein selecting $T_{e\_NR}$ further comprises selecting $T_{e\_NR}$ from a table based on BW and SCS being between two values or equal to one of the two values.

Example 22 is the computer program product of Example 20, wherein the $$T_{e\_NR} = \left(\frac{N}{2} + L\right) \cdot T_{S\_NR}$$

when SCS is 2·x, and where L is a fixed margin.

Example 23 is the computer program product of Example 20, wherein the $$T_{e\_NR} = \left(\frac{N}{2} + \frac{L}{2}\right) \cdot T_{S\_NR}$$

when SCS is 2·x, and where L is a fixed margin.

Example 24 is an apparatus for determining a timing error limit in a cellular system, the apparatus comprising: means for determining a reconfiguration event has occurred; means for determining a downlink (DL) bandwidth (BW) and a subcarrier spacing (SCS); and means for selecting a timing error limit($T_{e\_NR}$) based on the DL BW and the SCS, wherein the $T_{e\_NR}$=N+L when SCS is x, wherein L is 0 or a fixed margin; wherein the $T_{e\_NR}$≥2·N when SCS is $$\frac{x}{2};$$

and wherein the $$T_{e\_NR} \geq \frac{N}{2}$$

when SCS is 2·x.

Example 25 is a method of determining a timing error limit in a cellular system, the method comprising: determining a reconfiguration event has occurred; determining a downlink (DL) bandwidth (BW) and a subcarrier spacing (SCS); and selecting a timing error limit($T_{e\_NR}$) based on the DL BW and the SCS, wherein the $T_{e\_NR}$=N+L when SCS is x, wherein L is 0 or a fixed margin; wherein the $T_{e\_NR}$≥2·N when SCS is $$\frac{x}{2};$$

and wherein the $$T_{e\_NR} \geq \frac{N}{2}$$

when SCS is 2·x.

ADDITIONAL EXAMPLES

Additional Example 1 may include: the Timing Error Limit (i.e. $T_{e\_NR}$) may be designed differently according to different SCS. Given a certain downlink bandwidth (BW), if the SCS=x(kHz) and the $T_{e\_NR}$ of this SCS is N, then the $$T_{e\_NR} \text{ of } SCS = \frac{x}{2}(\text{kHz})$$

is 2*N.

Given a certain downlink BW, if the SCS=x(kHz) and the $T_{e\_NR}$ of this SCS is N, then the $$T_{e\_NR} \text{ of } SCS = 2^*x(\text{kHz}) \text{ is } \frac{N}{2}.$$

Additional Example 2 may include: the Timing Error Limit (i.e. $T_{e\_NR}$) may be designed differently according to different SCS. Given a certain downlink BW, if the SCS=x (kHz) and the $T_{e\_NR}$ of this SCS is N+L, then the $T_{e\_NR}$ of $$SCS = \frac{x}{2}(\text{kHz})$$

is 2*N+L; L is a fixed margin. Given a certain downlink BW, if the SCS=x(kHz) and the $T_{e\_NR}$ of this SCS is N+L, then the $T_{e\_NR}$ of $$SCS = 2^*x(\text{kHz}) \text{ is } \frac{N}{2} + L;$$

L is a fixed margin.

Additional Example 3 may include: Timing Error Limit (i.e. $T_{e\_NR}$) may be designed differently according to different SCS. Given a certain downlink BW, if the SCS=x(kHz) and the $T_{e\_NR}$ of this SCS is N+L, then the $T_{e\_NR}$ of $$SCS = \frac{x}{2}(\text{kHz})$$

is 2*N+2*L; L is an SCS specific margin, e.g.

$$L = \frac{N}{2}.$$

Given a certain downlink BW, if the SCS=x(kHz) and the $T_{e\_NR}$ of this SCS is N+L, then the $T_{e\_NR}$ of SCS=2*x(kHz) is $$\frac{N}{2} + \frac{L}{2};$$

L is an SCS specific margin, e.g.

$$L = \frac{N}{2}.$$

Additional Example 4 may include: Timing Error Limit (i.e. $T_{e\_NR}$) may be designed differently according to different SCS, but same $T_{e\_NR}$ may be applied for some of the SCS levels. Given a certain downlink BW, the SCS range is from x to y(kHz) and the $T_{e\_NR}$ of this SCS range may be implemented as a same value: N.

Additional Example 5 may include: Maximum Autonomous Time Adjustment Step (i.e. $T_{q\_NR}$) may be designed differently according to different SCS. Given a certain downlink BW, if the SCS=x(kHz) and the $T_{q\_NR}$ of this SCS is N, then the $T_{q\_NR}$ of SCS=x/2 (kHz) is 2*N. Given a certain downlink BW, if the SCS=x(kHz) and the $T_{q\_NR}$ of this SCS is N, then the $T_{q\_NR}$ of SCS=2*x(kHz) is $$\frac{N}{2}.$$

Additional Example 6 may include: the Maximum Autonomous Time Adjustment Step (i.e. $T_{q\_NR}$) may be designed differently according to different SCS. Given a certain downlink BW, if the SCS=x (kHz) and the $T_{q\_NR}$ of this SCS is N+L, then the $T_{q\_NR}$ of $$SCS = \frac{x}{2}(kHz)$$

is 2*N+L; L is a fixed margin. Given a certain downlink BW, if the SCS=x(kHz) and the $T_{q\_NR}$ of this SCS is N+L, then the $T_{q\_NR}$ of SCS=2*x(kHz) is $$\frac{N}{2} + L;$$

+L; L is a fixed margin.

Additional Example 7 may include: Maximum Autonomous Time Adjustment Step (i.e. $T_{q\_NR}$) may be designed differently according to different SCS. Given a certain downlink BW, if the SCS=x(kHz) and the $T_{q\_NR}$ of this SCS is N+L, then the $T_{q\_NR}$ of $$SCS = \frac{x}{2}(kHz)$$

is 2*N+2*L; L is an SCS specific margin, e.g.

$$L = \frac{N}{2}.$$

Given a certain downlink BW, if the SCS=x(kHz) and the $T_{q\_NR}$ of this SCS is N+L, then the $T_{q\_NR}$ of SCS=2*x(kHz) is $$\frac{N}{2} + \frac{L}{2};$$

L is an SCS specific margin, e.g.

$$L = \frac{N}{2}.$$

Additional Example 8 may include: Maximum Autonomous Time Adjustment Step (i.e. $T_{q\_NR}$) may be designed differently according to different SCS, but same $T_{q\_NR}$ may be applied for some of the SCS levels. Given a certain downlink BW, the SCS range is from x to y(kHz) and the $T_{q\_NR}$ of this SCS range may be implemented as a same value: N.

Additional Example 9 may include: Timing Error Limit (i.e. $T_{e\_NR}$) may be designed differently according to different SCS. Given a certain downlink BW, larger SCS level may have smaller $T_{e\_NR}$; smaller SCS level may have larger $T_{e\_NR}$.

Additional Example 10 may include: the Maximum Autonomous Time Adjustment Step (i.e. $T_{q\_NR}$) may be designed differently according to different SCS. Given a certain downlink BW, larger SCS level may have smaller $T_{q\_NR}$; smaller SCS level may have larger $T_{q\_NR}$.

Additional Example 11 may include an apparatus comprising means to perform one or more elements of a method described in or related to any of Additional Examples 1-10, or any other method or process described herein.

Additional Example 12 may include one or more non-transitory computer-readable media comprising instructions to cause an electronic device, upon execution of the instructions by one or more processors of the electronic device, to perform one or more elements of a method described in or related to any of Additional Examples 1-10, or any other method or process described herein.

Additional Example 13 may include an apparatus comprising logic, modules, or circuitry to perform one or more elements of a method described in or related to any of Additional Examples 1-10, or any other method or process described herein.

Additional Example 14 may include a method, technique, or process as described in or related to any of Additional Examples 1-10, or portions or parts thereof.

Additional Example 15 may include an apparatus comprising: one or more processors and one or more computer-readable media comprising instructions that, when executed by the one or more processors, cause the one or more processors to perform the method, techniques, or process as described in or related to any of Additional Examples 1-10, or portions thereof.

Additional Example 16 may include a signal as described in or related to any of Additional Examples 1-10, or portions or parts thereof.

Additional Example 17 may include a signal in a wireless network as shown and described herein.

Additional Example 18 may include a method of communicating in a wireless network as shown and described herein.

Additional Example 19 may include a system for providing wireless communication as shown and described herein.

Additional Example 20 may include a device for providing wireless communication as shown and described herein.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB, gNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

The invention claimed is:

1. An apparatus for a user equipment (UE), comprising:
a wireless interface configured to communicate with a radio access network (RAN) node; and
a processor coupled to the wireless interface, the processor configured to:
determine a reconfiguration event has occurred, the reconfiguration event corresponding to a first transmission after a random access channel (RACH)-less inter-radio access network (RAN) node handover; and
in response to the reconfiguration event:
determine a bandwidth (BW) and a subcarrier spacing (SCS); and
select a Timing Error Limit ($T_{e\_NR}$) associated with a value N based on the BW, the SCS associated with a value x, and a system basic timing unit.

2. The apparatus of claim 1, wherein:
the $T_{e\_NR}$=N+L when the SCS is x, wherein L is 0 or a fixed margin;
the $T_{e\_NR} \geq 2 \cdot N$ when the SCS is $$\frac{x}{2};$$

and
the $$T_{e\_NR} \geq \frac{N}{2}$$

when the SCS is 2·x.

3. The apparatus of claim 1, wherein the $$T_{e\_NR} = \frac{N}{2} + L$$

when the SCS is 2·x, where L is a fixed margin.

4. The apparatus of claim 1, wherein the $T_{e\_NR}=2 \cdot N+L$ when the SCS is $$\frac{x}{2},$$

where L is a fixed margin.

5. The apparatus of claim 1, wherein the $$T_{e\_NR} = \frac{N}{2} + \frac{L}{2}$$

when the SCS is 2·x, where L is a fixed margin.

6. The apparatus of claim 1, wherein the $T_{e\_NR}=2 \cdot N+2 \cdot L$ when the SCS is $$\frac{x}{2},$$

where L is a fixed margin.

7. The apparatus of claim 1, wherein the processor is a baseband processor.

8. A user equipment (UE) for determining a Maximum Autonomous Time Adjustment Step ($T_{q\_NR}$), the UE comprising:
- storage for the $T_{q\_NR}$; and
- a processor configured to:
  - determine a reconfiguration event has occurred, the reconfiguration event corresponding to a first transmission after a random access channel (RACH)-less handover inter-radio access network (RAN) node; and
  - in response to the reconfiguration event:
    - determine a bandwidth (BW) and a subcarrier spacing (SCS); and
    - select the $T_{q\_NR}$ associated with a value N based on the BW, the SCS associated with a value x, and a system basic timing unit.

9. The UE of claim 8, wherein:
the $T_{q\_NR}$=N+L when the SCS is x, wherein L is 0 or a fixed margin;
the $T_{q\_NR} \geq 2 \cdot N$ when the SCS is $$\frac{x}{2};$$

and
the $$T_{q\_NR} \geq \frac{N}{2}$$

when the SCS is 2·x.

10. The UE of claim 8, wherein the $$T_{q\_NR} \geq \frac{N}{2} + L$$

when the SCS is 2·x, where L is a fixed margin.

11. The UE of claim 8, wherein the $T_{q\_NR}$=2·N+L when the SCS is $$\frac{x}{2},$$

where L is a fixed margin.

12. The UE of claim 8, wherein the $$T_{q\_NR} = \frac{N}{2} + \frac{L}{2}$$

when the SCS is 2·x, where L is a fixed margin.

13. The UE of claim 8, wherein the $T_{q\_NR}$=2·N+2·L when the SCS is $$\frac{x}{2},$$

where L is a fixed margin.

14. The UE of claim 8, wherein the processor is a baseband processor.

15. A computer program product comprising a non-transitory computer-readable storage medium that stores instructions for execution by a processor to perform operations of a user equipment (UE), the operations, when executed by the processor, to perform a method, the method comprising:
- determining a reconfiguration event has occurred, the reconfiguration event corresponding to a first transmission after a random access channel (RACH)-less inter-radio access network (RAN) node handover; and
- in response to the reconfiguration event:
  - determining a bandwidth (BW) and a subcarrier spacing (SCS); and
  - selecting a Timing Error Limit ($T_{e\_NR}$) based on the BW associated with a value N, the SCS associated with a value x, and a system basic timing unit $T_{S\_NR}$.

16. The computer program product of claim 15, wherein selecting the comprises selecting the $T_{e\_NR}$ from a table based on the BW and the SCS being between two values or equal to one of the two values.

17. The computer program product of claim 15, wherein the $$T_{e\_NR} = \left(\frac{N}{2} + L\right) \cdot T_{S\_NR}$$

when the SCS is 2·x, and where L is a fixed margin.

18. The computer program product of claim 15, wherein the $$T_{e\_NR} = \left(\frac{N}{2} + \frac{L}{2}\right) \cdot T_{S\_NR}$$

when the SCS is 2·x, and where L is a fixed margin.

* * * * *